US008694906B2

(12) United States Patent
Cole et al.

(10) Patent No.: US 8,694,906 B2
(45) Date of Patent: Apr. 8, 2014

(54) DYNAMIC VISUALIZATION OF PHYSICAL AND GEOGRAPHICAL MULTITENANT CLOUD COMPUTING

(75) Inventors: Stephen Craig Cole, Redwood City, CA (US); Jason C. Fabbri, Roseville, CA (US); Robert Allan McCone, Signal Hill, CA (US); John Lyn Farmer, Santa Maria, CA (US)

(73) Assignee: Adobe Systems Incorporated, San Jose, CA (US)

( * ) Notice: Subject to any disclaimer, the term of this patent is extended or adjusted under 35 U.S.C. 154(b) by 355 days.

(21) Appl. No.: 12/761,097

(22) Filed: Apr. 15, 2010

(65) Prior Publication Data

US 2013/0346899 A1 Dec. 26, 2013

(51) Int. Cl.
*G06F 3/048* (2013.01)

(52) U.S. Cl.
USPC ........... 715/771; 715/734; 715/735; 715/736; 715/738; 715/739

(58) Field of Classification Search
USPC ................... 709/220–226; 715/733–739, 771
See application file for complete search history.

(56) References Cited

U.S. PATENT DOCUMENTS

| 7,356,770 | B1* | 4/2008 | Jackson | 715/736 |
|---|---|---|---|---|
| 2003/0004874 | A1* | 1/2003 | Ludwig et al. | 705/40 |
| 2006/0294231 | A1* | 12/2006 | Blencowe | 709/224 |
| 2008/0065470 | A1* | 3/2008 | Nelmes et al. | 705/10 |
| 2009/0201293 | A1* | 8/2009 | Tung et al. | 345/440 |
| 2009/0300607 | A1 | 12/2009 | Ferris et al. | |
| 2009/0300608 | A1 | 12/2009 | Ferris et al. | |
| 2011/0029882 | A1* | 2/2011 | Jaisinghani | 715/736 |
| 2011/0055385 | A1* | 3/2011 | Tung et al. | 709/224 |

FOREIGN PATENT DOCUMENTS

WO   WO 2009/155574   6/2008

OTHER PUBLICATIONS

Nagios XI—Product Overview, Jan. 2010, available at http://http://assets.nagios.com/datasheets/nagiosxi/Nagios%20X1%20-%20Product%20Overview.pdf, last accessed Mar. 18, 2010.
Nagios XI—Product Features, Jan. 2010, available at http://assets.nagios.com/datasheets/nagiosxi/Nagios%20X1%20-%20Features.pdf, last accessed Mar. 18, 2010.
Sun Microsystems, "Introduction to Cloud Computing Architecutre," 1st edition, Jun. 2009.
Virtualmin—"About Cloudmin," copyright 2005-2009, available at http://www.virtualmin.com/about-cloudmin, last accessed Mar. 18, 2010.

(Continued)

*Primary Examiner* — Amy Ng
*Assistant Examiner* — Claudia Dragoescu
(74) *Attorney, Agent, or Firm* — Kilpatrick Townsend & Stockton LLP

(57) ABSTRACT

A cloud computing infrastructure administration system can track use of cloud computing resources by customer, hardware utilization, and geographical location in a unified manner, the cloud may be administered much more efficiently. A cloud computing visualization tool can use the tracked data to provide multiple visualization options to aid in cloud computing management. For instance, usage can be tracked and information displayed on a per-customer, per-machine, per-location, and/or other basis. Thus, administrators can, for example view a particular customer's use of resources regardless of location but also view a location's allocation of resources regardless of customer. The tool can be configured to restrict access by login, and thus customers or other parties other than administrators may view data.

20 Claims, 11 Drawing Sheets

(56) References Cited

OTHER PUBLICATIONS

Webmin—"Introduction to Webmin," copyright 2005-2009, available at http://www.webmin.com/intro.html, last accessed Mar. 18, 2010.

Amazon.com—"Amazon EC2," copyright 2010, available at http://aws.amazon.com/ec2/, last accessed Mar. 18, 2010.

Amazon.com—"Cloudwatch," copyright 2010, available at http://aws.amazon.com/cloudwatch/, last accessed Mar. 18, 2010.

Amazon.com—"Amazon Simple Storage Service," copyright 2010, available at http://aws.amazon.com/s3/, last accessed Mar. 18, 2010.

* cited by examiner

DYNAMIC VISUALIZATION OF PHYSICAL AND GEOGRAPHICAL MULTITENANT CLOUD COMPUTING

TECHNICAL FIELD

The disclosure below generally relates to systems and methods for administration of computing devices.

BACKGROUND

Cloud computing environments provide flexible access to computing resources. Typically, one or more datacenters rely on networking infrastructure to link computing devices (e.g., server devices) together and to make the devices available to customers. Depending upon the goals of an enterprise providing the cloud computing environment, the customers may be external parties or may be other entities (e.g., business units) within the same enterprise. In any event, the customers will execute applications via the computing devices. The applications may be executed directly using the device hardware and/or the devices may be used to provide a virtualized environment, with the application(s) executed therein.

SUMMARY

The cloud computing infrastructure may pose a logistical challenge, with hundreds or thousands of machines, network components, racks, hubs, and oftentimes numerous data centers.

Embodiments configured in accordance with one or more aspects of the present subject matter can aid an enterprise in managing its cloud computing infrastructure by not only tracking use of cloud computing resources by customer, but by also providing options for tracking and reporting based on other factors including (but not limited to) hardware identity/utilization and geographical location. By treating customer-related data, hardware (and other resource) utilization-related data, and resource location data in a unified manner, the cloud may be administered much more efficiently, such as by visualizing cloud use and configuration data from multiple different perspectives.

In an embodiment, a computing system can comprise a processor and memory, with the memory embodying program components of a cloud computing visualization tool. The tool can use data from a cloud computing infrastructure database to provide multiple visualization perspectives to aid in cloud computing management. For instance, usage can be tracked and information displayed on a per-customer, per-resource, per-location, and/or other basis. Thus, administrators can, for example view a particular customer's use of resources regardless of location but also view a location's allocation of resources regardless of customer. Via the same interface, the administrator can investigate the distribution and status of machines at a particular datacenter location and/or unit within the datacenter.

In some embodiments, the visualization tool further supports updating the infrastructure database by cloud administrators and/or can generate billing reports and invoices. For example, based on a review of a customer's usage, an administrator can redistribute computing resources and/or make recommendations for the customer to maximize its return on cloud computing spending. The billing process itself may also be streamlined. The tool can be configured to restrict access by login in some embodiments, and thus a customer or another party other than an administrator may view some or all of the data applicable to the customer's resources.

These illustrative embodiments are discussed not to limit the present subject matter, but to provide a brief introduction. Additional examples of embodiments of systems, methods, and computer-readable media configured in accordance with the present subject matter are described below in the Detailed Description. Objects and advantages of the present subject matter can be determined upon review of the specification and/or practice of an embodiment in accordance with one or more aspects taught herein.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1:
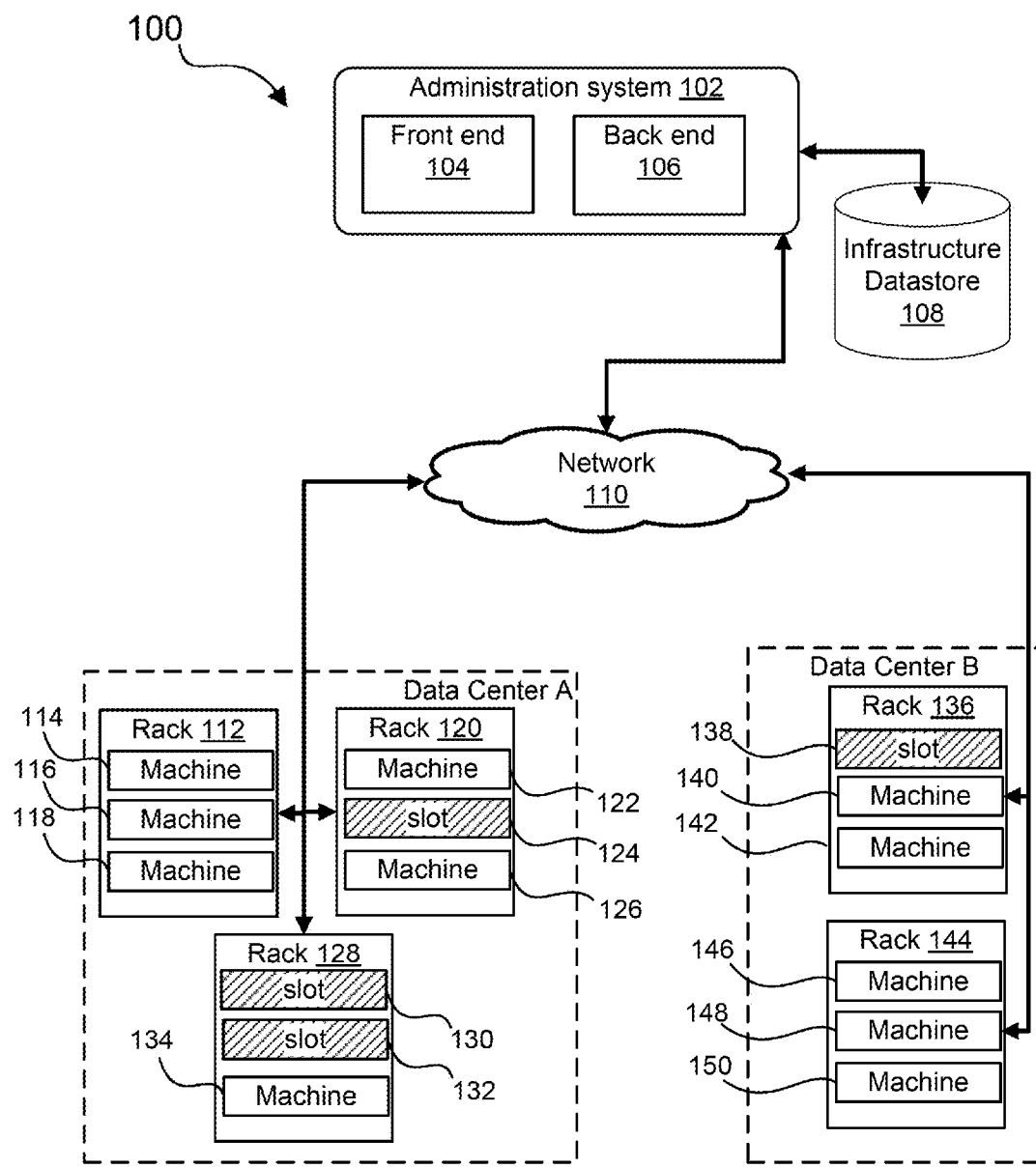
FIG. 1 is a diagram illustrating an embodiment of a cloud computing system including a cloud computing administration system configured in accordance with aspects of the present subject matter.

FIG. 1 is a diagram illustrating an embodiment of a cloud computing system 100 that includes a cloud computing administration system 102 configured in accordance with aspects of the present subject matter. Generally speaking, administration system 102 comprises front-end components 104 and back-end components 106. As will be discussed in further detail below, front-end components 104 can include a cloud computing infrastructure visualization tool that allows administrators to view detailed information on various aspects of the cloud computing environment.

Back-end components 106 comprise one or more applications, processes, or other software that aggregate data regarding the cloud infrastructure and respond to requests. As shown in FIG. 1, the aggregated data is stored in an infrastructure datastore 108. In some embodiments, back-end components 106 also respond to requests from front-end components 104 to update the datastore, such as in response to administrative commands adding, removing, or changing cloud components or usage. In practice, front-end components 104 and back-end components 106 could be provided using a single unified application or may, as detailed below, be provided using a plurality of applications/processes configured to communicate with one another; in either event, components 104 and 106 could be provided using the same computing device or different devices.

Administration system 102 is linked via network 110 to a plurality of data centers. In this example, two data centers ("Data Center A" and "Data Center B") are shown. Data Centers A and B may be at any location relative to one another and may be geographically dispersed. In practice, fewer or more data centers could be managed. Network 110 may comprise the Internet in some embodiments, although additionally or alternatively other network types could be used.

Data Center A comprises a rack 112 including three machines (e.g., servers) 114, 116, and 118. Rack 120 comprises two machines 122 and 126 and an empty slot 124, while rack 128 comprises two empty slots 130 and 132 along with a machine 134. Data Center B comprises a rack 136 featuring a slot 138 and two machines 140 and 142, while rack 144 is fully utilized with machines 146, 148, and 150.

This example is simplified for purposes of discussion—in practice, the number of racks in a data center may vary, machine types can be any suitable computing device, and the number of slots in a rack can vary; in certain instances, racks may not be used at all. Each machine in use may be of the same or similar types, or multiple different types of machines may be used. Additionally, other infrastructure such as switches, routers, hubs, and the like are not shown.

The physical arrangement of the computing resources (i.e., the data centers, rack locations in the data centers, machine locations in the racks, etc.) may pose a logistical challenge to an administrator interested in finding a particular component, such as a machine of interest or an open slot in a rack that meets particular characteristics (e.g., power availability and connectivity).

Management may become even more complex when customer considerations come into play. As an example, a customer may utilize machines 116, 134, and 150, which are located in different racks from one another and across multiple data centers. The customer may have requirements, such as a particular amount of memory and/or processing capability, that the cloud computing administrators have agreed to meet. Although a virtual machine may be dynamically reconfigured, the customer may desire a physical machine with the given characteristics. If the customer subsequently demands a RAM upgrade, the cloud computing administrators will need to physically pull machines 116, 134, and 150 to perform the upgrade or locate a machine with the desired characteristics to substitute.

Figure 2:
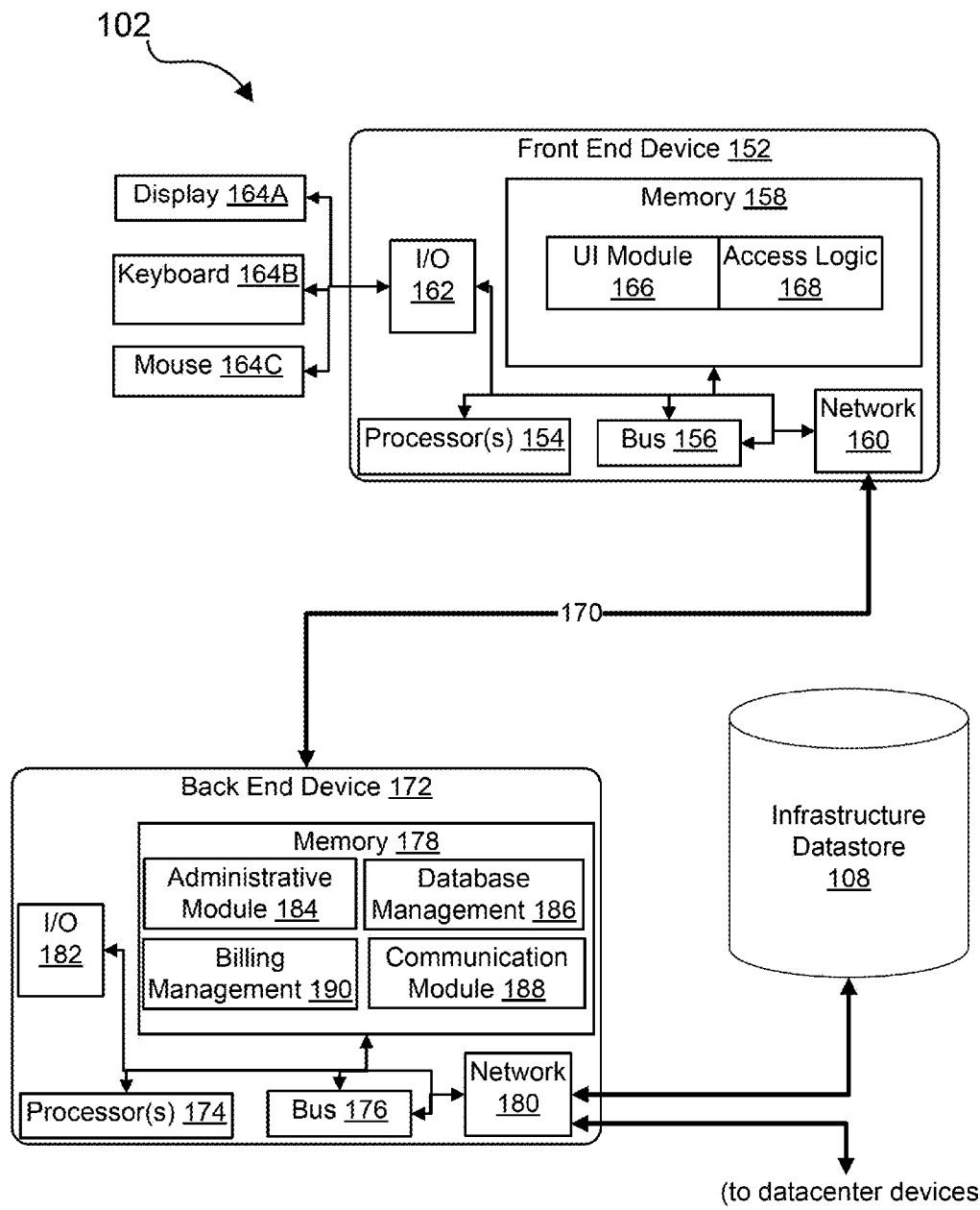
FIG. 2 is a diagram illustrating an embodiment of a cloud computing administration system in closer detail.

Embodiments configured in accordance with the present subject matter can simplify such tasks. FIG. 2 is a diagram illustrating an embodiment of a cloud computing administration system 102 in closer detail. In this example, a front-end computing device 152 is used to provide a visualization tool that is configured to provide various perspectives about cloud use and configuration, such as viewing data in terms of customers, resource characteristics, and resource locations.

Computing device 152 comprises one or more processors 154, a tangible, non-transitory computer-readable medium (memory 158), a networking component 160, and an I/O interface 162 linking I/O components such as display 164A, keyboard 164B, and mouse 164C to the device. For example, memory 158 may comprise RAM, ROM, or other memory accessible by processor 154. I/O interface 162 can comprise a graphics interface (e.g., VGA, HDMI) to which display 164A is connected, along with a USB or other interface to which keyboard 164B and mouse 164C are connected.

Display 164A can use any display technology, including, but not limited to, LCD, LED, CRT, and the like. In addition to or instead of a keyboard/mouse, another pointing device and/or a touch-enabled display could be used. Networking component 160 may comprise an interface for communicating via wired or wireless communication, such as via Ethernet, IEEE 802.11 (Wi-Fi), 802.16 (Wi-Max), Bluetooth, infrared, and the like. As another example, networking component 160 may allow for communication over communication networks, such as CDMA, GSM, UMTS, or other radio communication networks.

In this example, the cloud infrastructure visualization tool is provided using a user interface (UI) module 166 and access logic 168. UI module 166 configures front-end computing device 152 to present a user interface with various viewing options for cloud infrastructure data, such as viewing resource allocation by customer, resource usage information, and resource location information. Additionally, billing information (by customer, resource, or location, for example) can be displayed in some embodiments, along with reports on component history. In some embodiments, UI module also supports an administrative interface for updating cloud infrastructure data and configuration of the cloud.

Generally speaking, UI module 166 generates the user interface by rendering components (e.g., text boxes, buttons, sliders, graphic elements, etc.) on the display and processing user input such as keyboard, mouse, and other commands. The data for populating the components can be retrieved by access logic module 166, which represents program components that configure front-end computing device 154 to query the back-end computing device 172 via network connection 170. In some embodiments, some previously-obtained data may be locally cached as well. If other commands (e.g., administrative, billing) are to be supported, access logic 168 may make appropriate calls to update the database and/or invoke other services provided by back-end computing device 172.

Some elements may be populated directly with data returned from the data store. However, the visualization tool may include additional program components that provide additional processing on the retrieved data, referred to as "meta-processing" herein.

For instance, depending on organization of the datastore, steps may be required to generate a particular view. As an example, the datastore may identify a machine as related to a particular client in a number of ways—in one embodiment, the machine record may include a "client" field, while in another embodiment, the machine record may be linked to a record in a "client" table. The visualization tool can include suitable modules for identifying those links. As a further example, the visualization tool may provide output that does not directly correspond to data, such as output representing a count of the number of machines associated with a client and/or location. As another example, the visualization tool can include logic to assemble billing and other records using constituent data retrieved from the datastore.

As yet another example, usage data may be tracked over time and used to generate forecasts for future resource utilization and/or billing. For example, the visualization tool may include a forecasting module that accesses a set of data and attempts to match the data to one or more models. The forecasting module may apply the model directly to billing data and/or to underlying usage data in making billing forecasts. For instance, the amount of bandwidth used by a customer may be tracked over a year and used to extrapolate estimated bandwidth use when the customer increases its number of machines.

In some embodiments, UI module 166 and access logic 168 are included in a cross-platform application configured for use in a runtime container. For instance, an application may be written for use with Adobe(R) Flash(R) or Air(R), both available from Adobe Systems Incorporated of San Jose, Calif. However, a standalone application could be used. As another example, the front-end could be provided as a web service, e.g., using asynchronous JavaScript and XML (AJAX) techniques. For instance, a browser on front-end device 152 could be used to render UI views generated by a UI generation module 166 on a remote server, with the server also including access logic 168.

Back-end computing device 172 represents another computing device or system, and comprises a processor 174, bus 176, memory 178, networking component(s) 180, and I/O interface components 182. Although no display, keyboard, etc. are shown, back-end device 172 could use those or other input device.

Back-end device 172 is configured by program components 184-188 to aggregate and process information from the datacenter computing devices (not shown) and to respond to requests and commands from front-end applications. For example, administrative module 184 can represent suitable processes/applications that authenticate users for accessing and/or changing data in infrastructure datastore 108 and other aspects of the cloud or the cloud management system. Additionally, administrative module 184 can configure back-end device 172 to receive queries and/or commands from one or more front-end devices 152 and pass appropriate events, requests, and/or data to other back-end components.

Database management module 186 can comprise one or more processes/applications that are used to maintain datastore 108. For instance, administrative module 184 may route a query to module 186, which then returns a results array for administrative module 184 to pass back to the requesting client. In some embodiments, database management module 186 comprises software to maintain datastore 108 as an SQL database, with the remaining components at the back-end implemented using Ruby on Rails™ or another web application framework.

Generally, the data in datastore 108 can comprise data related to cloud infrastructure resources. This can comprise data related to any physical infrastructure resource including, but not limited to, machines, switches, routers, hubs, racks, cages or any other device that has a network address (e.g., power distribution units, remote cameras) can be tracked. Additionally, the data may also relate to other infrastructure resources—for example, bandwidth usage, technical support, use of licensed software, and other activities conducted in support of the datacenter can be tracked as well. Some of the infrastructure resources may correspond to billable items, i.e., can be billed to customers, while other infrastructure resources may correspond to overhead, although "overhead" could itself be treated as a "customer" for tracking purposes.

Communication module 188 represents applications and/or processes that communicate with cloud resources. For example, each datacenter, rack, and/or machine may report statistics to communication module 188, which then passes information to database management module 186 for inclusion in the database. For instance, a server machine may report information such as machine startup, available RAM, temperature, processor use, and the like. This information can be gathered via communication module 188 and then appropriate database records can be generated or updated.

Billing management module 190 represents applications/processes that configure back-end device 172 to utilize infrastructure datastore 108 in order to generate invoices and other records for use in billing customers for infrastructure usage. For example, billing management module 190 may configure back-end device 172 to query the datastore for records of when a given machine was allocated to a customer, usage information regarding that machine while allocated to the customer, and any other events logged in the datastore with respect to that machine (e.g., maintenance events) during the time interval. Billing management module 190 can then access billing parameter data (e.g., costs per machine, cost data per time interval, cost per event, etc.) in order to generate an invoice. The invoice may be stored in datastore 108 in some embodiments.

Although shown at back-end device 172, some or all the functionality of billing management module can be included in the front-end application. This may allow the visualization tool, for example, to perform the meta-processing needed to generate billing detail records. The billing records can be added to the infrastructure datastore, stored elsewhere, and/or sent on to customers as needed. Similarly, the forecasting module discussed above as included in the front-end application may be included partially or wholly at the back-end if it is computationally-intense.

Although device 172 is depicted as a single device in this example, multiple computing devices (e.g., multiple different server machines) could be used together on the back-end, depending upon the amount of processing power needed. Although this example depicts a separate front-end computing device 152 linked via network connection 170 to a back-end computing device 172, it will be understood that in some embodiments the same device could be used to provide front-end and back-end functionality.

Figure 3:
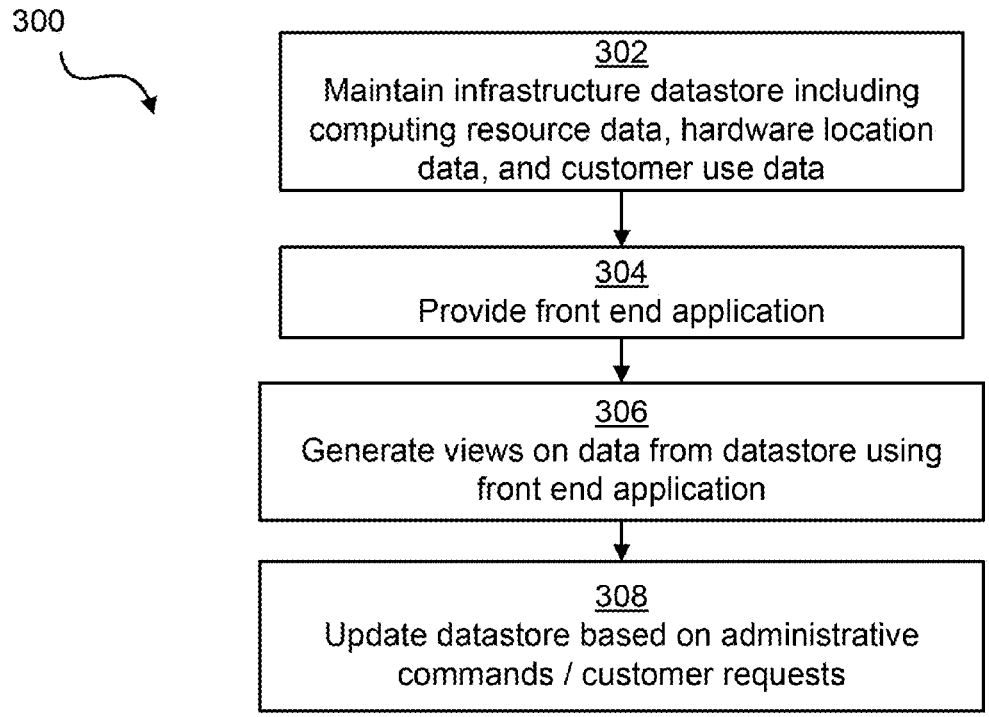
FIG. 3 is a flowchart showing steps in an illustrative method of administering a cloud computing system.

FIG. 3 is a flowchart showing steps in an illustrative method 300 of administering a cloud computing system. Block 302 represents maintaining an infrastructure datastore, the infrastructure data store including infrastructure resource data, hardware location data, and customer-related data. The datastore may be represented using one or more database tables. Examples of information are noted below:

| Category | Description | Scope |
|---|---|---|
| Business Units | Organizational units within a company | For each company |
| Clients | Name and contact information, associated business unit | For each customer |
| Projects | Efforts associated with a particular client | For each client |
| Machine location | Rack and datacenter location | for each machine |
| Machine assignment | Customer machine allocated to | for each machine |
| Machine specifications | Hardware specifications for machine | For each machine |
| Machine statistics | Operational/utilization data | For each machine |
| Cages | Location, type capacity for a cage | For each cage |
| Bandwidth | Network usage | For each infrastructure resource that can consume bandwidth |
| Rental fees | Cost per time period, event, and/or other | For each type of billing |

-continued

| Category | Description | Scope |
| --- | --- | --- |
| | identifier used in connection with an infrastructure resource | |
| Administrative | Machine setup, maintenance events | For each trackable administrative task |
| Licenses | Technology license | For each client, customer, or other unit utilizing a licensed technology |

The information in the table above is meant for purposes of example only. In practice, the data can be maintained in a number of ways. For example, the datastore may include a database table with a record corresponding to each server machine and other piece of hardware across the entire cloud infrastructure. Records in that database table may be linked to respective records in another database table of data centers and a further table having a record for each cage or rack to thereby express machine location data. Alternatively, a table of machines may be maintained with a record for each machine including a "location" and "rack" field in the record.

In one embodiment, a hierarchy of information is maintained, starting from Business Units, and proceeding to Clients within Business Units and Projects within Clients. Any suitable infrastructure resource can be tracked, including bandwidth use, particular machines and other equipment, and rented slots within datacenter racks. For instance, a rented item such as a machine, slot, or the like can be tracked in terms of its specifications, location, etc. along with a project, effective date, and (optionally) a billing type. Multiple billing types may be maintained, with different price ranges for different types. At the time billing takes place, a running database of all rented machines can be consulted along with machine type and effective date in order to generate a billing amount for a particular project.

In terms of organization of resources, in some embodiments, data centers include one or more racks. Each rack can have one or more machines, and machines can exist within specific environments (e.g., networks, local area networks, etc.). Additionally, as noted above, another example of an infrastructure resource is a technology licenses. Licenses (e.g., software, hardware, and/or other licenses) can be tracked. For example, technology may be licensed by machine, customer, number of users, etc., and the datastore can be used to track the number of licenses and other pertinent data along with appropriate associations with customer data in order to bill out license costs.

Initially, the data for the infrastructure datastore may be manually generated or generated using information in existing records and by linking the records together. Maintaining the datastore can also comprise updating the records therein based on administrative activity carried out using cloud administrative tools. For example, if a new data center is to be brought online or a machine added or relocated, an administrative tool may be used to generate appropriate work requests via a form-driven interface. Data from the forms can be used to populate new records and/or update existing records to reflect the new data center or machine data.

As another example, machine statistics may be tracked automatically and stored in the infrastructure datastore. For example, machines, racks, and/or entire datacenters may include tracking applications or process to measure statistics, such as machine (or datacenter) temperature, machine load, bandwidth utilization, and the like. Based on information dispatched from the tracking applications/processes, appropriate records linked to the tracked machine(s), datacenter(s), etc. can be updated.

Block 304 represents providing a front-end application. As noted above, in some embodiments a separate front-end application can be used to query an infrastructure datastore in order to generate various views on the data. For example, a Flash(R) or Air(R) application may be made available for access via a desktop, laptop, or other computer or even via a mobile device.

Block 306 represents generating views on the data from the data store using the front-end application. An example of using a front-end application and exemplary views are noted below. Generally, the front-end application can include programming that specifies desired combinations of data for particular views, with the desired combinations of data obtained using database queries generated by the front-end application.

Block 308 represents updating the datastore based on administrative commands and/or customer requests provided via the front-end application. In some embodiments, the front-end application can view data but updates to the datastore can only be made via a separate administration application. However, some embodiments may support an administrative view in the front-end application to define new resources, update location data, and/or update customer information and machine assignments from within the front-end application. These commands can be converted into appropriate database update requests.

In some embodiments, commands can be generated to implement the changes. For example, commands can be routed to back-end components to generate and route documents to personnel to carry out the requests However, in some embodiments, infrastructure resources (e.g., network equipment, servers, etc.) can be manipulated directly via the administrative interface in order to provision, modify, and tear down interconnected systems comprising a service. For example, a customer may request a new virtual machine instance to be brought online. An administrator can access a "create virtual machine" command and enter the requested information. Commands can then be issued to appropriate network equipment, servers, and the like to create and enable the virtual machine while the infrastructure datastore is updated to reflect the new details for the customer and machine, including billing information and information on the physical resources used to provide the virtual instance.

The administrative view may be made available to administrators of the cloud infrastructure, but could be extended to customers in at least some respects. For example, the administrative view may allow customers to submit requests for new/changed machines or capabilities and to view data regarding infrastructure components the customers "own," "rent," or are otherwise billed for.

Figure 4:
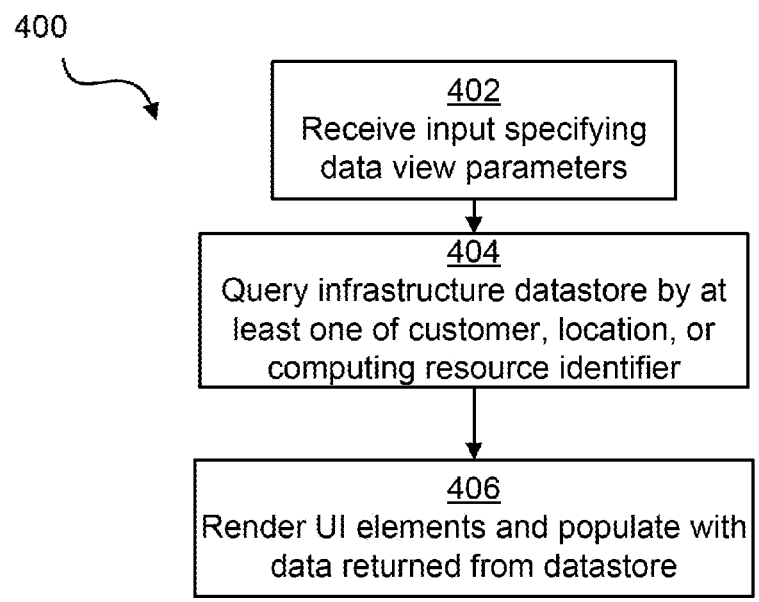
FIG. 4 is a flowchart showing steps carried out by an illustrative embodiment of a cloud computing infrastructure visualization tool.

FIG. 4 is a flowchart showing steps in a method 400 carried out by an illustrative embodiment of a cloud computing infrastructure visualization tool. Block 402 represents receiving input specifying data view parameters. This may, for instance, comprise selection of a tab or menu option to view cloud resources by customer, location, or other identifier. As another example, the input may comprise identification of a particular item of interest (i.e., a particular hardware resource, data center, etc.) from within another data view.

Block 404 represents querying the infrastructure data store by at least one of a customer, location, or infrastructure resource identifier and accessing results that comprise customer, location, and infrastructure resource identity/utilization. For example, the infrastructure resource identifier may refer to one or more particular server machines or other hardware resource(s) or non-hardware resources; the identifier may be for specific instances or a type of resource. The utilization information may comprise information about current load, bandwidth, and the like. As another example, a particular view may specify that the computing resource information is to be displayed for a particular customer, such as distribution of machines by customer regardless of location.

The visualization tool can be configured to make one or more queries associated with the desired view and perform additional meta-processing as appropriate. Continuing with the resource-by-customer example, that view may be associated with a query to the "machine" table listing all machines in the cloud. The resource-by-customer view may further be associated with a meta-processing routine that identifies the customer associated with each machine and generates a running total for use in providing machine counts by customer.

Block 406 represents rendering UI elements and populating the elements based on data returned from the datastore. Continuing with the resource-by-customer view example, the total machine count for each customer can be used as inputs to generate a graphic, such as is displayed in FIG. 5A and discussed below. More generally, each view can have one or more UI elements associated with the view, with the visualization tool using raw data and/or the results of meta-processing by the tool itself.

Figure 5A:
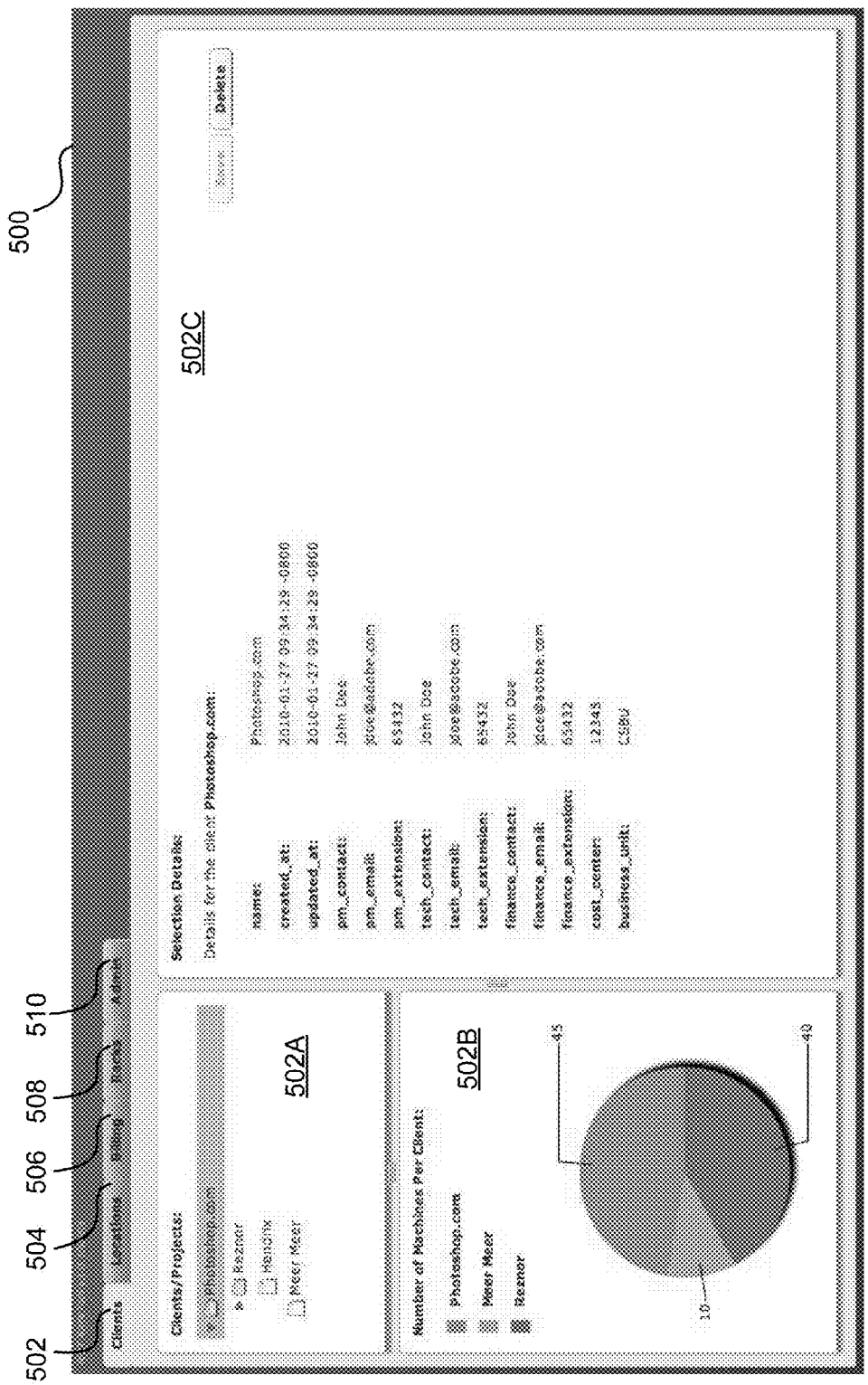
FIGS. 5A-5G are screenshots showing example interfaces that can be provided by a cloud computing infrastructure visualization tool using data from a cloud computing infrastructure database.

FIGS. 5A-5G are screenshots showing example interfaces that can be provided by a cloud computing infrastructure visualization tool using data from a cloud computing infrastructure database. Turning first to FIG. 5A, an interface 500 includes a plurality of tabs 502, 504, 506, 508, and 510 that are used as inputs by the visualization tool.

In this example, tab 502 is selected and the visualization tool provides a resource-by-client view. In particular, three panes 502A, 502B, and 502C are shown. Pane 502A presents a list of clients of the cloud. For example, pane 502A may be populated by querying a "clients" table to determine current clients of the cloud. In some embodiments, as shown here, clients or customers may have further identifiers, such as particular project names, cost centers, and the like. In this example, selection of "photoshop.com" in the nested list UI element is used to further process the returned data.

For example, pane 502B is an example of a graphic element, particularly a pie chart, generated by counting the number of machines associated with each client. This can allow an administrator to view the overall use of cloud resources by customer. Pane 502C shows the customer record for "photoshop.com," which includes fields such as creation date, name, contact information, cost center information, finance contact information, and other pertinent data for use in interacting with the customer. Additionally, as noted below, by tracking finance contact information alongside configuration and usage information, billing and communications options can be built into the visualization tool.

Figure 5B:
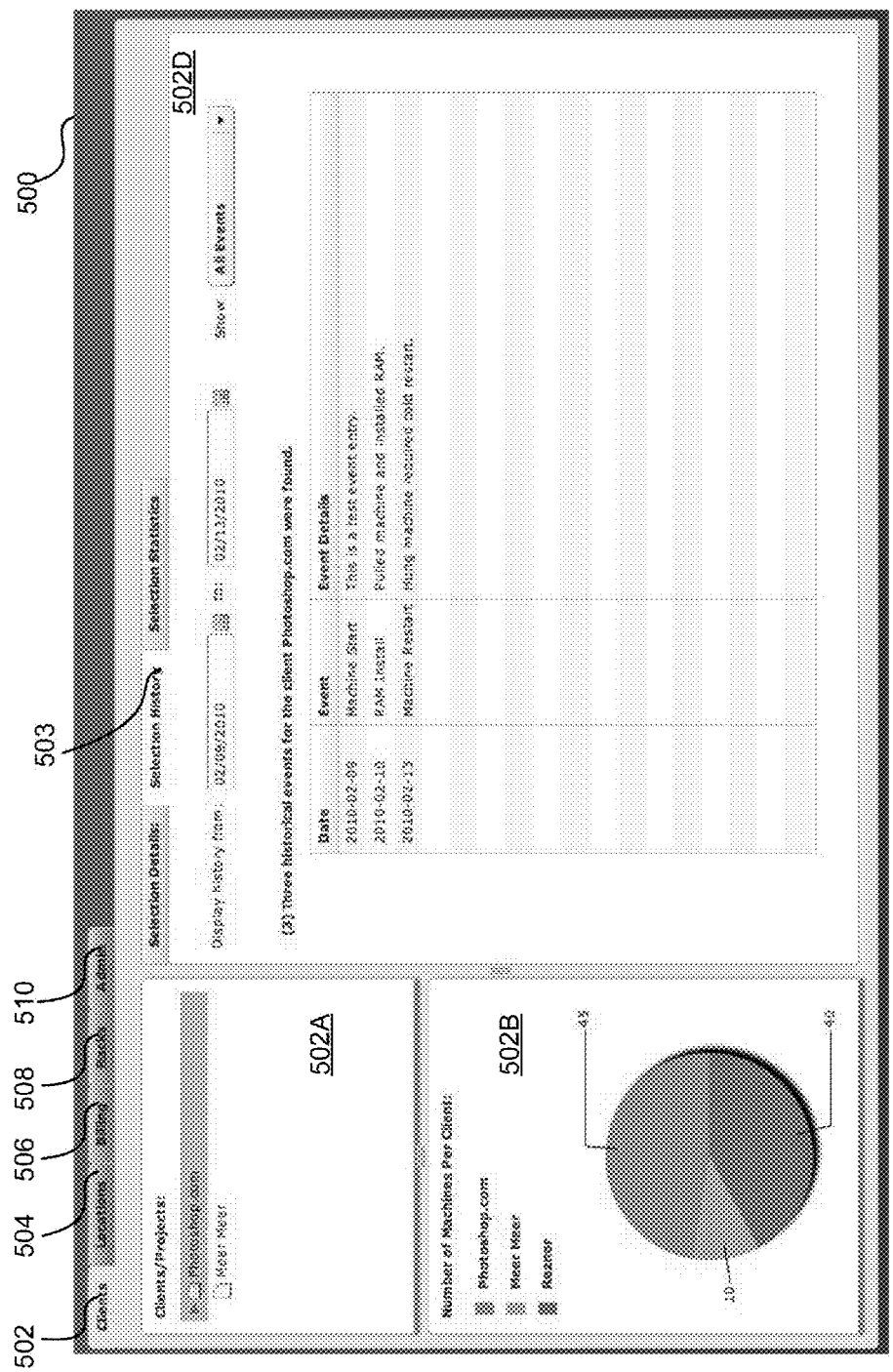

FIG. 5B shows another embodiment of the resource-by-customer view. In this example, photoshop.com remains selected in pane 502A. However, pane 502D includes a tab interface 503 that allows use of a "selection history" view. This view may query the datastore for historical data associated with the customer. For example, FIG. 5B shows events such as machine starts, RAM installation, and restart tasks logged with respect to machines allocated to photoshop.com and as reflected by database records. As noted previously, in some embodiments statistical and administrative data can be tracked by collecting data from machines and/or by logging administrative tasks. These database records can be associated with particular machines or other infrastructure resources. Since the machines are associated with a given customer, the visualization tool can assemble a view such as shown in FIG. 5B to track all logged events for the customer. In this example, sorting and scope options are provided to limit the view to a given time frame and event type, if desired.

Figure 5C:
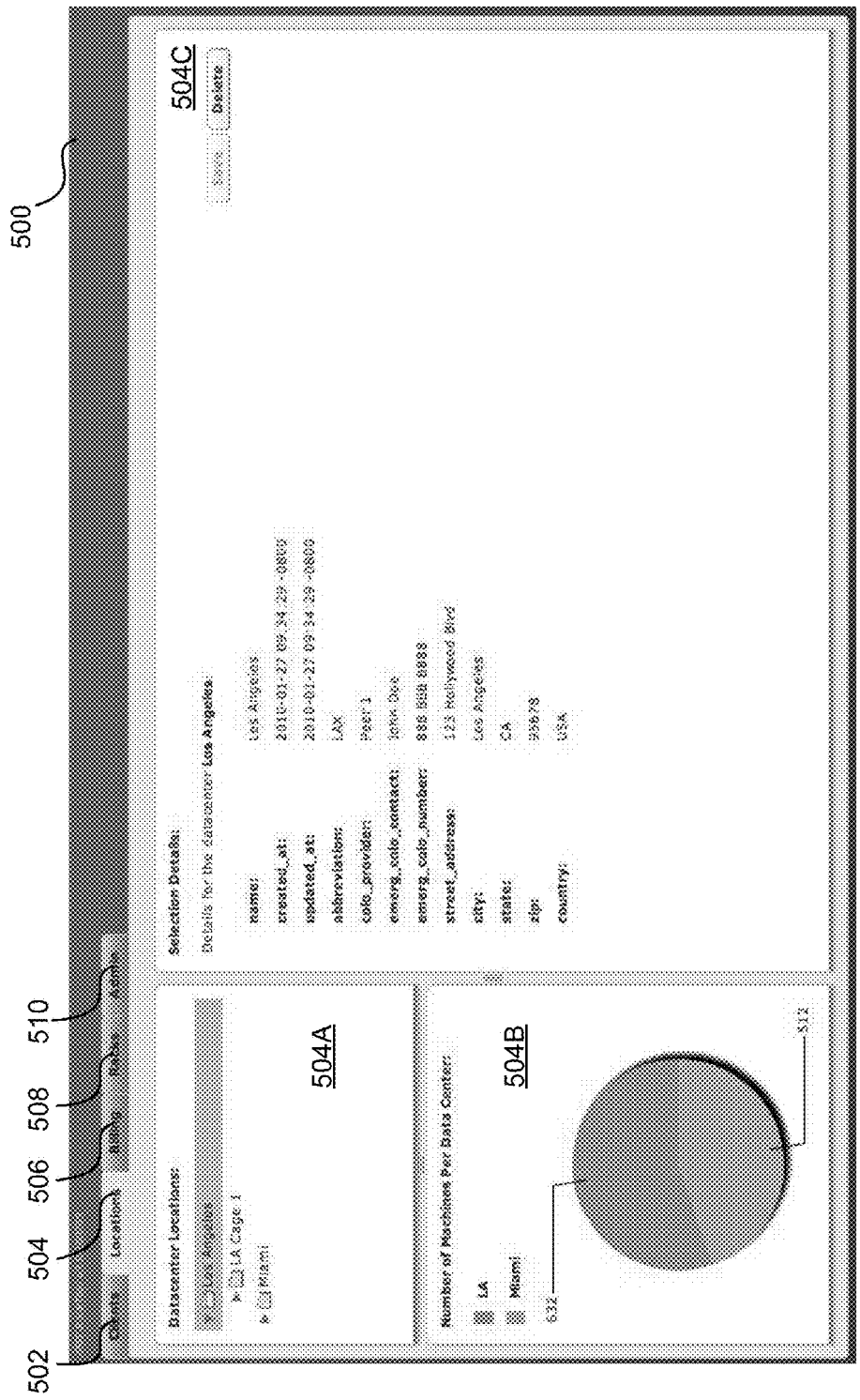

FIG. 5C shows a resource-by-location view generated in response to selection of tab 504. In this example, a first pane 504A includes a nested list of locations. The locations may be further divided into suitable logical units—for example, a location may have subcategories such as cages, racks, and the like. Pane 504B represents a count of machines by location and/or subdivision within the location. The visualization tool can query the datastore to obtain the machine records and then maintain a running count of machines based on the location associated with each machine to generate the pie chart shown in FIG. 5C.

Although a pie chart is shown in this example, any suitable graphic element can be used in pane 504B (and for any other instance of a graphic element depicted in a view). For example, each view may be generated based on settings and metadata, some of which may be user-adjustable. As an example, if a user prefers bar charts to pie charts, a selection option can be included to change the graphic element type.

Figure 5D:
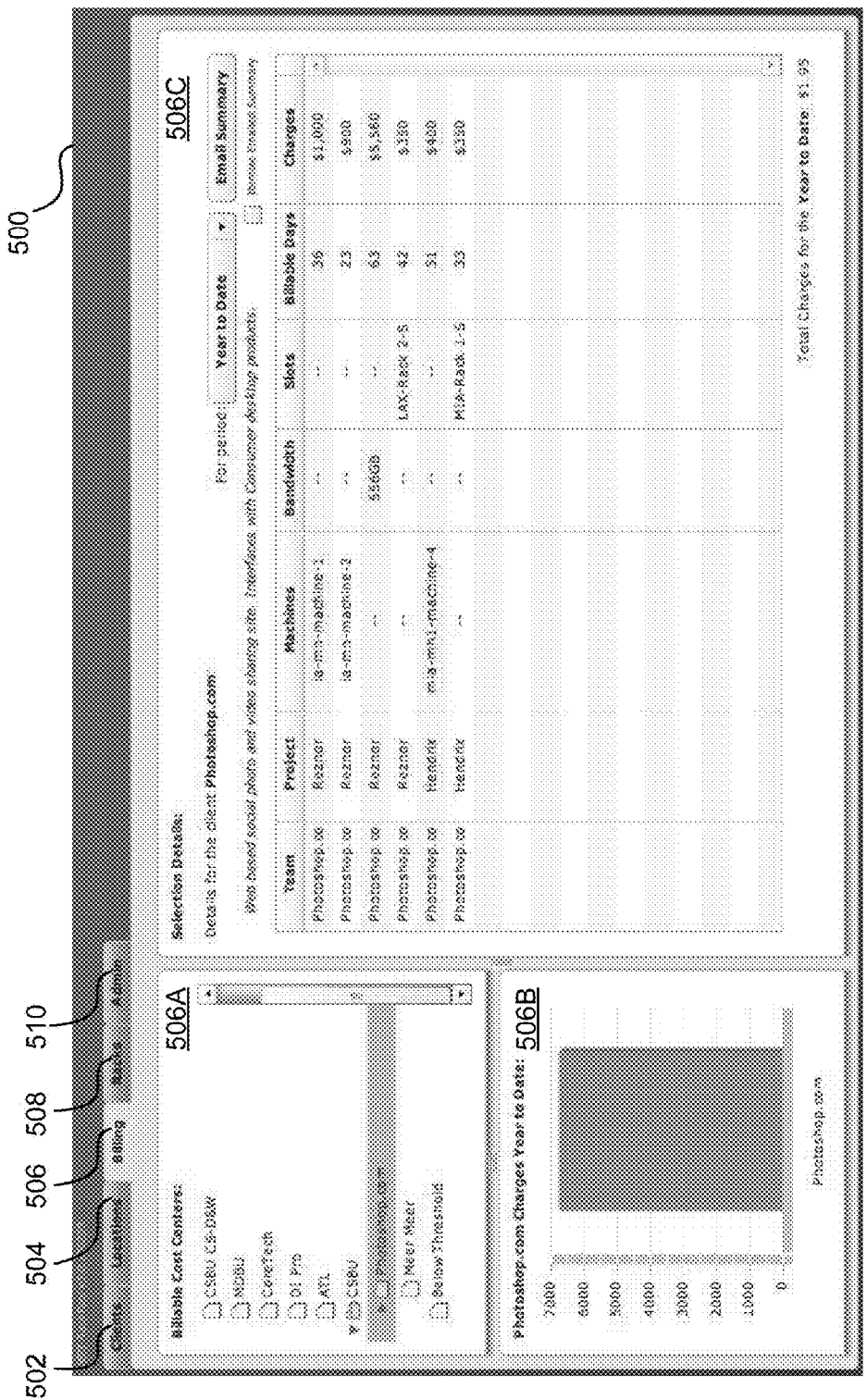

FIG. 5D shows an example of a view rendered when billing tab 506 is selected. In this example, a pane 506A allows for a user to specify a particular cost center, while pane 506B is a bar chart for the selected cost center. In this example, the "photoshop.com" selection in the nested list has no active sub-elements, so only a single bar is shown but if an item in the nested list were opened to display its nested sub-elements, the bar chart could break out the sub-elements individually.

Pane 506 depicts a detailed billing summary for the selected cost center. In this example, the billing summary includes all charges in the specified period ("year to date"). The billing record may be assembled by a billing component in the back-end, such as component 190 of FIG. 2, by locating all machines associated with a particular client, all events associated with the machines, usage data associated with the machines, and then cross-referencing billing rates. In some embodiments, rather than relying on a back-end component, the visualization tool includes logic for assembling the billing reports at the front-end by making appropriate database queries.

In this example, the billing view is initially sorted by cost center. In some embodiments, the cloud administration tool is usable internally by a unit or portion of an enterprise to provide services to other units of the enterprise. The other units of the enterprise may each comprise a unique cost center. Particular customers may correspond to entire cost centers and/or to particular projects within a cost center. Each cost center/customer may have contact information available in the database, such as the finance contact information shown in pane 502C of FIG. 5A. Logic for the billing view can access such data so that, in response to the "email summary" command, the visualization tool can output the billing summary to the appropriate contact (or contacts).

Figure 5E:
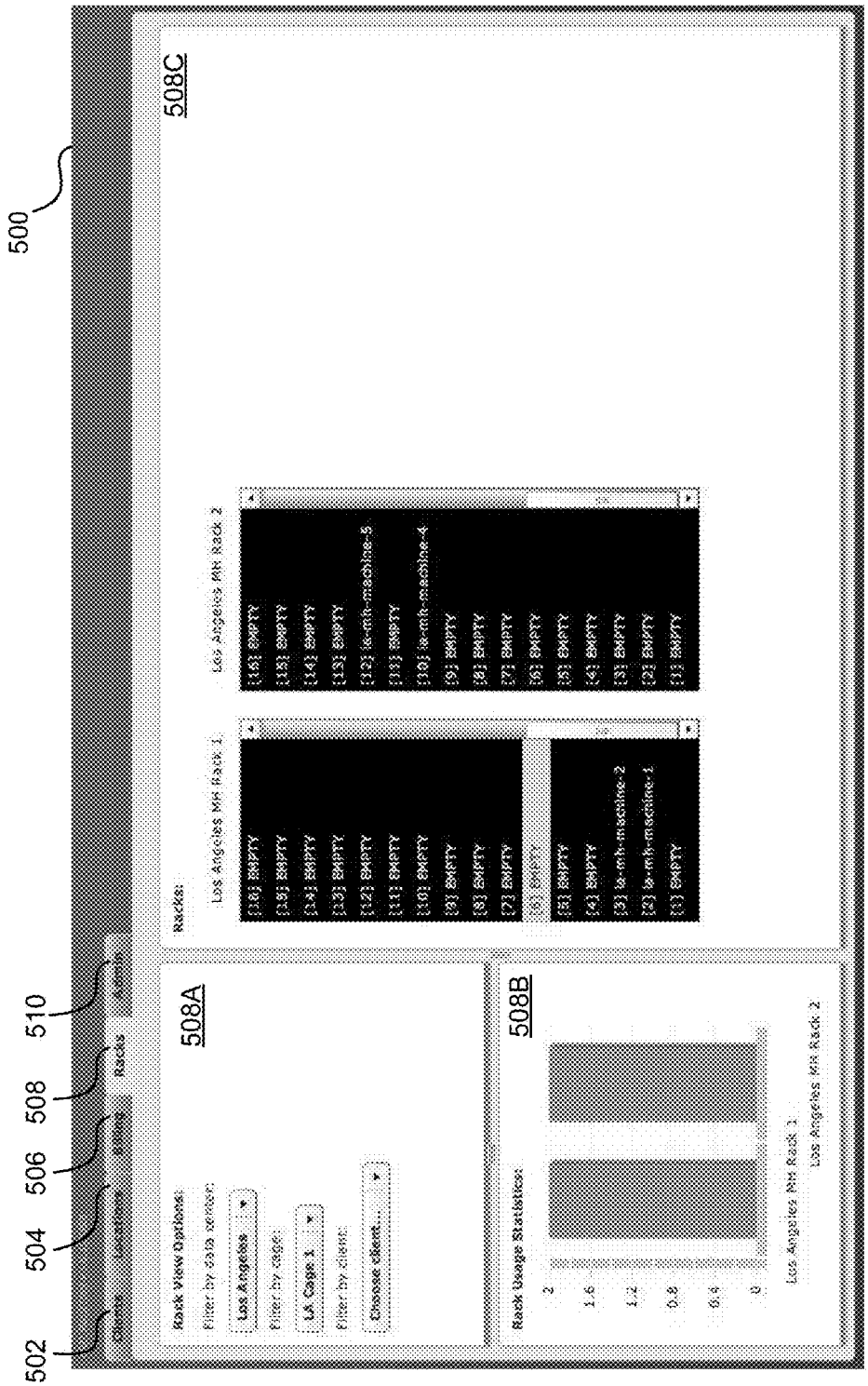

FIG. 5E depicts a view generated in response to selection of tab 508 to view resources at a more granular level, particularly by racks. Pane 508A includes interface elements to filter the rack view by data center, cage, and/or by client. Pane 508B is a graphic showing utilization statistics; the graphic may, for instance, present a view of the total slots per rack at a datacenter along with an indication of how many slots are filled. Pane 508C provides a listing for each rack, identifying empty slots and machine information for occupied slots. In some embodiments, the slots and machines are clickable to jump to a detailed record for the respective slot and/or machine.

The "racks" view may be generated by searching for records associated with a particular data center and cage (if selected) in order to identify which racks are of interest. Machines can then be identified by searching for machine records linked to or including the racks of interest. If a particular client is selected, those results can be further narrowed by searching for machines associated with the client of interest. The rack view may allow an administrator to ascertain where slots are available for expansion or to identify consolidation options. In this example, the Los Angeles data center includes two racks, but both are relatively empty. A cost-saving option may be to consolidate machines into a single rack.

In some embodiments, additional data can be indicated as to machine/rack status. For instance, if machine statistics such as temperature, utilization, etc. are tracked, the view in pane 508C can be updated based on the statistics. As a particular example, machine temperature may be indicated by changing the text color or highlighting machine identifiers. This may allow an administrator to diagnose ongoing or potential problems and plan accordingly. For example, machines in a given rack may be running hot, and thus it may be inadvisable to add more machines to the rack even if slots are available. As another example, the administrator may filter the rack view by client and discover that all machines associated with a given client are at capacity and/or are running hot, and the administrator may recommend appropriate action (e.g., buy more powerful machines) to the client.

Figure 5F:
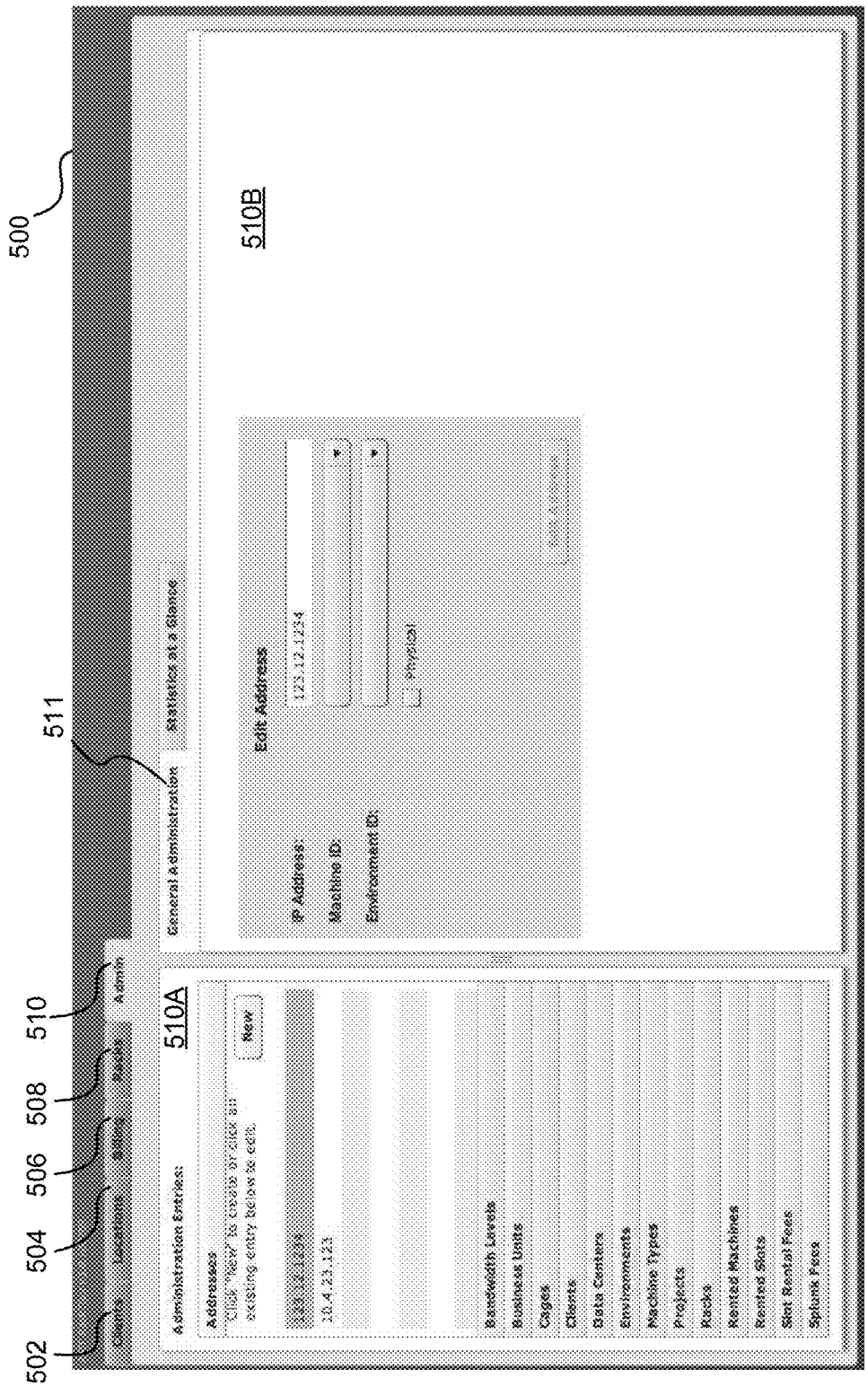
Figure 5G:
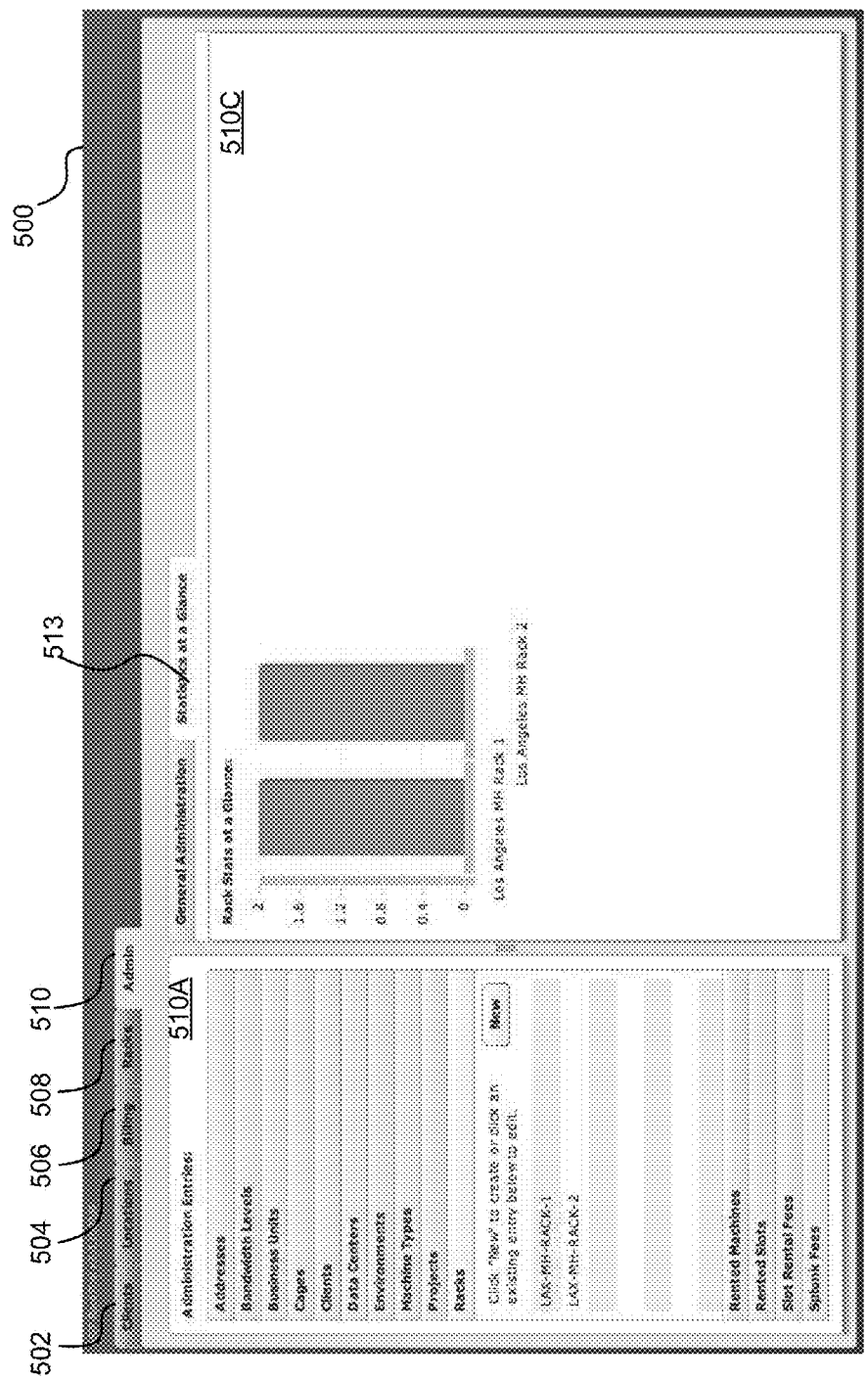

FIGS. 5F-5G each illustrate views generated in response to selection of administration tab 510. Administration tab 510 may allow for detailed browsing of data in the infrastructure datastore. In some embodiments, the administration interface can be used to update datastore records directly and/or to dispatch events to change the cloud configuration.

Pane 510A provides a plurality of expandable panels for viewing and defining administrative entries. This example allows for the following items to be viewed and, via pane 510B, to be edited.

| Item | Description |
|---|---|
| Addresses | Machine IP address assignments |
| Bandwidth Levels | Bandwidth utilization and/or restrictions for infrastructure resources |
| Business Units | Identity and contact information for sub-units within customers |
| Cages | Identity of sub-units within datacenters |
| Clients | Customer identification and contact information |
| Data Centers | Identity, location, and contact information for data centers |
| Environments | Networks, local area networks, or other organizational units for computing resources |
| Machine Types | Specification data for machines; each machine record can reference a defined type |
| Projects | Sub-unit within business units |
| Racks | Sub-unit within cages |
| Rented Machines | Identity of machines and association with customers (or sub-units thereof) |
| Rented Slots | Identity of machine location within racks |
| Slot Rental Fees | Billing data for use in calculating fees based on number of rented slots |
| Licensed Software Feess | Administrative fee data for use of licensed software |

In this example, an administrator is editing an IP address in pane 510B. Particularly, the IP address can be associated with a particular machine and environment. This interface also allows a checkbox to be used to specify whether the machine is a physical machine or a virtual machine.

In FIG. 5F, tab 511 was selected for editing data. Tab 513 is selected in FIG. 5G to display pane 510C, which allows viewing of data. In this example, the "racks" panel is expanded and provides a listing of all racks tracked by the system. A bar chart graphic has been generated by counting the number of racks; in this example no further data is depicted in the graphic.

The visualizations noted above were for purposes of example only. Variations in visualization type and content will be apparent to one of skill in the art upon review of this disclosure. More generally, the visualization tool can provide numerous other perspectives of cloud infrastructure across multiple categories. Accordingly, administrators can view and update data not only in terms of resource identity/utilization, customer identity/billing, or location, but can instead easily switch between the different perspectives from within a single interface. The interface, as noted above, can rely on a database tracking information across those varied perspectives. The underlying logic for the visualizations may be tailored to the particular database schema and other characteristics, and so the examples of querying and processing of data will be understood as examples and not as limitations.

Figure 6:
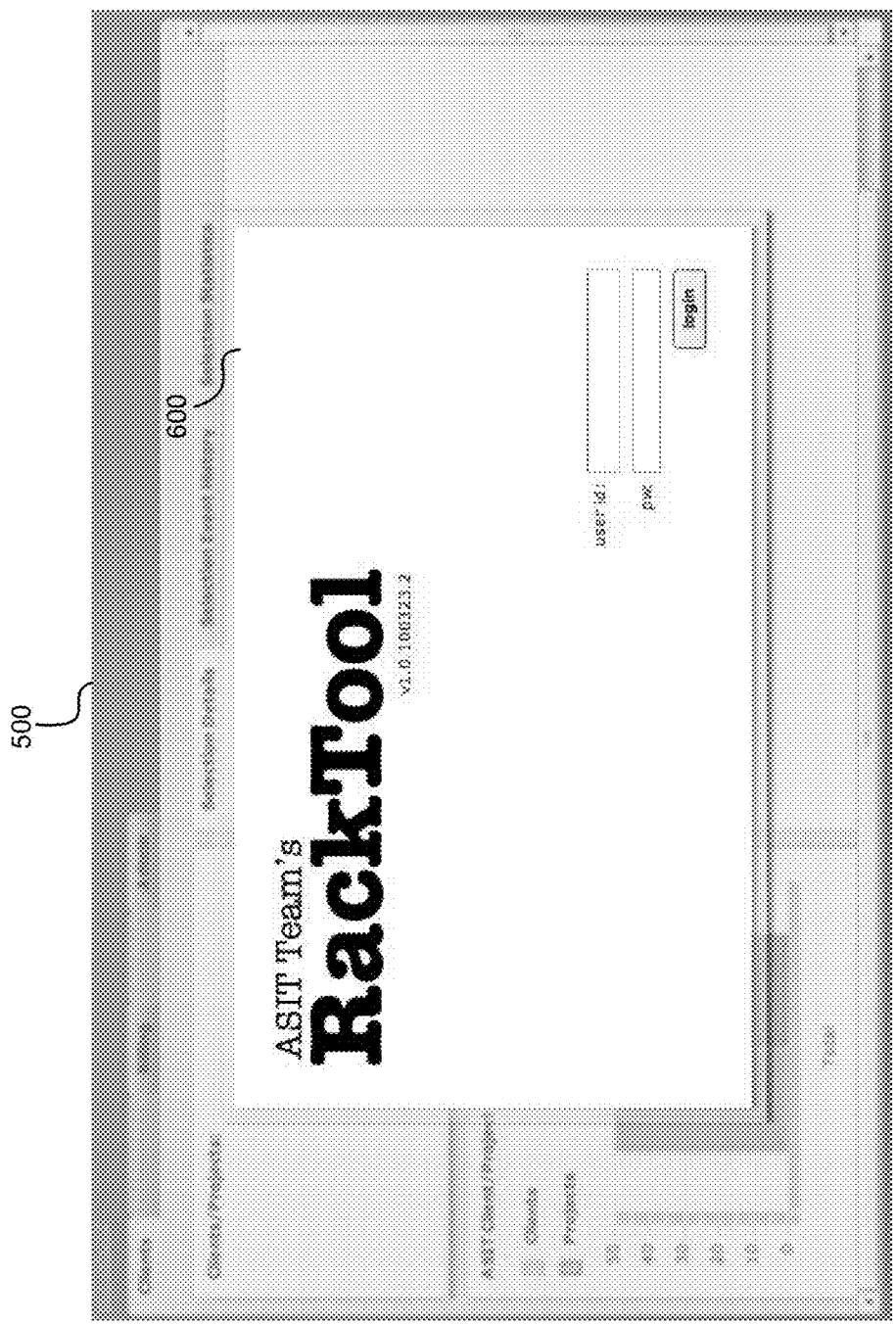
FIG. 6 is a screenshot showing an example of an interface to permit controlled access to a visualization tool.

FIG. 6 is a screenshot showing an example of an interface 600 to permit controlled access to a visualization tool. In this example, interface 600 comprises a login window with username and password fields that must be entered before window 500 becomes accessible. As mentioned previously, in some embodiments the same visualization tool functionality used by cloud administrators can be made available (at least in part) to customers or other interested parties. In order for the organization providing the cloud infrastructure to retain control, access rights can be used to limit the data viewable and/or administrative commands available based on a user's login information.

For example, in one embodiment customers can be provided login rights to view data records associated with infrastructure resources utilized by the customer. As an example, the customer may be able to view all physical infrastructure resources across various datacenters, the customer's billing information, and the like. Administrative commands may not be available at all, or may be subject to limitations. For instance, the customer may have the ability to update contact information, but not to provision new machines. On the other hand, in some embodiments "self-service" options could be made available, such as allowing a customer to perform machine updates, reallocate resources amongst the customer's projects, and perform other tasks.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, portable music players, and consumer electronic devices such as cameras, camcorders, and mobile devices. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

Communications between systems and devices may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computing system comprising a processor and a non-transitory computer-readable medium embodying program components, the program components comprising:
    a user interface module that configures the computing system to provide an interface for a cloud computing infrastructure visualization tool, the interface including selection options for viewing infrastructure resources by customer, by location, or by infrastructure resource identity using data from an infrastructure data source, wherein the interface includes a selection option for a billing interface, the billing interface configured to display billing details based on data from the infrastructure data source and automatically calculate and display a forecast of future resource utilization comprising future bandwidth usage, wherein the future bandwidth usage is determined by tracking an amount of bandwidth used by infrastructure resources over a period of time and extrapolating the future bandwidth usage when a number of machines is changed; and
    an access module that configures the computing system to query the infrastructure data source for one or more records to populate elements of the interface,
    wherein the user interface module is configured to populate the interface based on data in the records.

2. The computing system set forth in claim 1, wherein the program components further comprise a billing module that configures the computing system to access billing parameter data from the infrastructure data source and generate the billing details using the billing parameter data and the one or more records.

3. The computing system set forth in claim 1, wherein the interface further comprises a selection option for an administrative interface, and
wherein the program components further comprise an administrative module that configures the computing system to update a record in the data store in response to input received in the administrative interface.

4. The computing system set forth in claim 1, wherein the user interface module configures the computing system to provide a data center interface in response to a selection option to view components by location,
wherein the data center interface identifies all infrastructure resources associated with a respective datacenter regardless of customer association.

5. The computing system set forth in claim 1, wherein the user interface module configures the computing system to provide a customer interface in response to a selection option to view components by customer,
wherein the customer interface identifies all infrastructure resources associated with a customer regardless of datacenter or other location.

6. The computing system set forth in claim 5, wherein the infrastructure resources comprise billable items and the billable items comprise physical resources associated with the customer.

7. The computing system set forth in claim 6, wherein the customer interface identifies a plurality of events, the events associated with at least one physical resource associated with the customer and comprising a machine.

8. The computing system set forth in claim 1, wherein the user interface module configures the computing system to provide a rack interface in response to a selection option to view components by location,
wherein the rack interface identifies machine locations within one or more racks within one or more datacenters.

9. A computer-implemented method comprising:
providing an interface for a cloud computing infrastructure visualization tool, the interface including a selection option for viewing infrastructure resources by customer, a selection option for viewing infrastructure resources by geographical location, and a selection option for viewing infrastructure resources by infrastructure resource identity, wherein the interface includes a selection option for a billing interface, the billing interface configured to display billing details based on data from the infrastructure data source and automatically calculate and display a forecast of future resource utilization comprising future bandwidth usage, wherein the future bandwidth usage is determined by tracking an amount of bandwidth used by infrastructure resources over a period of time and extrapolating the future bandwidth usage when a number of machines is changed;
querying an infrastructure data source for one or more records to populate elements of the interface based on data in the records; and
populating elements of the interface using data from the infrastructure data source.

10. The method set forth in claim 9, wherein the interface further comprises a selection option for a billing interface, the billing interface configured to display billing details based on data from the infrastructure data source.

11. The method set forth in claim 10, further comprising accessing billing parameter data from the infrastructure data source and generating the billing details using the billing parameter data and the one or more records.

12. The method set forth in claim 11, further comprising identifying a contact from the one or more records, providing a send option in the interface, and, in response to receiving input selecting the send option, sending the billing details to the contact.

13. The method set forth in claim 11, further comprising, prior to providing, querying, and populating:
receiving a visualization tool application at a mobile device, the visualization tool application configuring the mobile device to carry out providing, querying, and populating.

14. The method set forth in claim 9, further comprising providing a data center interface in response to a selection option to view components by location,
wherein the data center interface identifies all infrastructure resources associated with a respective datacenter regardless of customer association.

15. The method set forth in claim 9, further comprising providing a customer interface in response to a selection option to view components by customer,
wherein the customer interface identifies all infrastructure resources associated with a customer regardless of datacenter or other location.

16. The method set forth in claim 15, wherein the infrastructure resources comprise billable items and the billable items comprise physical resources associated with the customer.

17. The method set forth in claim 16, wherein the customer interface identifies a plurality of events, the events associated with at least one physical resource associated with the customer and comprising a machine.

18. The method set forth in claim 9, further comprising providing a rack interface in response to a selection option to view components by location,
wherein the rack interface identifies machine locations within one or more racks within one or more datacenters.

19. The computing system set forth in claim 3, wherein the administrative module configures the computing system to add a virtual machine in response to an input received in the administrative interface.

20. The computing system set forth in claim 1, wherein the billing interface comprises a send button, and the program components configure the computing system to send the billing details to a contact identified from the one or more records.

* * * * *